United States Patent
Shimizu

(10) Patent No.: US 10,248,013 B2
(45) Date of Patent: Apr. 2, 2019

(54) LIGHT SOURCE APPARATUS AND PROJECTOR

(71) Applicant: SEIKO EPSON CORPORATION, Tokyo (JP)

(72) Inventor: Tetsuo Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/887,262

(22) Filed: Feb. 2, 2018

(65) Prior Publication Data
US 2018/0239229 A1  Aug. 23, 2018

(30) Foreign Application Priority Data
Feb. 23, 2017  (JP) .................. 2017-032363

(51) Int. Cl.
*G03B 21/20* (2006.01)
*G03B 21/00* (2006.01)

(52) U.S. Cl.
CPC ......... *G03B 21/204* (2013.01); *G03B 21/006* (2013.01); *G03B 21/2013* (2013.01)

(58) Field of Classification Search
CPC ............. G03B 21/204; G03B 21/006; G03B 21/2013; G03B 21/2033; G03B 21/28; G03B 33/00
See application file for complete search history.

(56) References Cited

U.S. PATENT DOCUMENTS

| | | | |
|---|---|---|---|
| 8,827,458 B2 * | 9/2014 | Kimura ................. | G03B 21/14 353/31 |
| 2012/0050691 A1 * | 3/2012 | Tsuda ................... | G03B 21/204 353/31 |
| 2014/0111967 A1 * | 4/2014 | Rehn ....................... | F21V 9/40 362/84 |

FOREIGN PATENT DOCUMENTS

JP  2013-250494 A  12/2013

* cited by examiner

*Primary Examiner* — Anne M Hines
(74) *Attorney, Agent, or Firm* — Oliff PLC

(57) ABSTRACT

A light source apparatus according to an aspect of the invention includes a light source array including a plurality of first light emitting devices and a plurality of second light emitting devices and a light branching element that causes a first light ray flux emitted from the plurality of first light emitting devices and a second light ray flux emitted from the plurality of second light emitting devices to travel in directions different from each other. The light source array is formed of a plurality of series circuits including a first series circuit and a second series circuit. The first series circuit and the second series circuit each include at least one of the plurality of first light emitting devices and at least one of the plurality of second light emitting devices.

14 Claims, 7 Drawing Sheets

LIGHT SOURCE APPARATUS AND PROJECTOR

BACKGROUND

1. Technical Field

The present invention relates to a light source apparatus and a projector.

2. Related Art

There is proposed a projector including a light source apparatus in which a phosphor is irradiated with excitation light emitted from a light emitting device, such as a semiconductor layer, and resultant fluorescence light is used as illumination light.

JP-A-2013-250494 discloses a light source apparatus including a solid-state light source unit including a plurality of semiconductor lasers each emitting blue light, a dichroic mirror, a phosphor layer, a retardation film, a diffuser plate, and a reflection plate. Some of the plurality of semiconductor lasers emit S-polarized light with respect to the dichroic mirror, and the other semiconductor lasers emit P-polarized light with respect to the dichroic mirror. The S-polarized light is reflected off the dichroic mirror and excites the phosphor layer. The phosphor emits yellow fluorescence light. The P-polarized light passes through the dichroic mirror, is incident on the diffuser plate, and further reflected off the reflection plate into blue diffused light. The fluorescence light from the phosphor layer and the blue diffused light from the diffuser plate are combined with each other by the dichroic mirror into white light.

In the illuminator described above, assume that the plurality of semiconductor lasers that each emit P-polarized light, which forms the blue diffused light, are, for example, connected to each other in series to form a single series circuit. In a case where open failure (failure in disconnection mode) has occurred in the series circuit, no electric power is supplied to all the semiconductor lasers provided in the series circuit, resulting in no generation of the blue diffused light. As a result, the white illumination light is undesirably not produced in a stable manner.

That is, in the light source apparatus of related art, in the case where the light from the light source array formed of a plurality of light emitting devices is branched into two light ray fluxes, and they are used for different purposes, and when one of the light ray fluxes is not emitted at all due to open failure of the series circuit, the light source apparatus undesirably cannot perform the desired function.

SUMMARY

An advantage of some aspects of the invention is to provide a light source apparatus that avoids a situation in which one of a plurality of branched light ray fluxes is not emitted at all even when open failure of a series circuit occurs. Another advantage of some aspects of the invention is to provide a projector including the light source apparatus.

A light source apparatus according to an aspect of the invention includes a light source array including a plurality of first light emitting devices and a plurality of second light emitting devices and a light branching element that causes a first light ray flux emitted from the plurality of first light emitting devices and a second light ray flux emitted from the plurality of second light emitting devices to travel in directions different from each other. The light source array is formed of a plurality of series circuits including a first series circuit and a second series circuit. The first series circuit and the second series circuit each include at least one of the plurality of first light emitting devices and at least one of the plurality of second light emitting devices.

In the light source apparatus according to the aspect of the invention, for example, even if open failure occurs in the first series circuit and all the light emitting devices provided in the series circuit do not emit light, the second series circuit in which no open failure has occurred includes at least one first light emitting device and at least one second light emitting device, whereby a situation in which one of the first light ray flux and the second light ray flux is not outputted at all is avoided.

The light source apparatus according to the aspect of the invention may further include a wavelength conversion element that converts the first light ray flux into fluorescence light.

According to the configuration described above, the second light ray flux and the fluorescence light can be used to produce light having a desired color.

The light source apparatus according to the aspect of the invention may further include a diffuser element that converts the second light ray flux into diffused light.

In general, fluorescence light has a wide angular distribution. According to the configuration described above, which allows the angular distribution of the second light ray flux to approach the angular distribution of the fluorescence light, color unevenness of exiting light produced from the second light ray flux and the fluorescence light can be suppressed.

In the light source apparatus according to the aspect of the invention, the plurality of series circuits may further include a third series circuit, and the third series circuit may be connected in series to the first series circuit.

According to the configuration described above, the plurality of series circuits can be controlled in a simplified manner.

The light source apparatus according to the aspect of the invention may further include a light source controller that controls the light source array. The plurality of series circuits may further include a fourth series circuit. The fourth series circuit may include at least one of the plurality of first light emitting devices and at least one of the plurality of second light emitting devices. The light source controller may have a function of controlling the light source array in such a way that the first series circuit and the second series circuit operate but the fourth series circuit does not operate.

According to the configuration described above, the light source controller allows the fourth series circuit not to operate in a normal use condition but allows the fourth series circuit to operate only when open failure occurs. That is, the fourth series circuit plays the role as a backup series circuit. A decrease in the amount of exiting light in a case where open failure occurs can thus be avoided.

In the light source apparatus according to the aspect of the invention, a wavelength of the first light ray flux and a wavelength of the second light ray flux may differ from each other.

According to the configuration described above, the wavelength of each of the light ray fluxes can be optimized in accordance with the use of each of the first and second light ray fluxes.

The light source apparatus according to the aspect of the invention may further include a light ray combining system that combines the fluorescence light and the second light ray flux with each other.

According to the configuration described above, white exiting light can be produced.

A projector according to another aspect of the invention includes the light source apparatus according to the aspect of the invention, a light modulator that modulates light from the light source apparatus in accordance with image information to produce image light, and a projection system that projects the image light.

The projector according to the aspect of the invention can stably display an image having a predetermined color.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 4.

A projector according to the present embodiment is an example of a liquid crystal projector including a light source apparatus using semiconductor lasers.

In the following drawings, components are drawn at different dimensional scales in some cases for clarity of each of the components.

A projector 1 according to the present embodiment is a projection-type image display apparatus that displays color video (images) on a screen (projection surface) SCR. The projector 1 uses three light modulators corresponding to color light fluxes, red light LR, green light LG, and blue light LB. The projector 1 uses a semiconductor laser that provides high-luminance, high-intensity light as a light emitting device of the light source apparatus.

Figure 1:
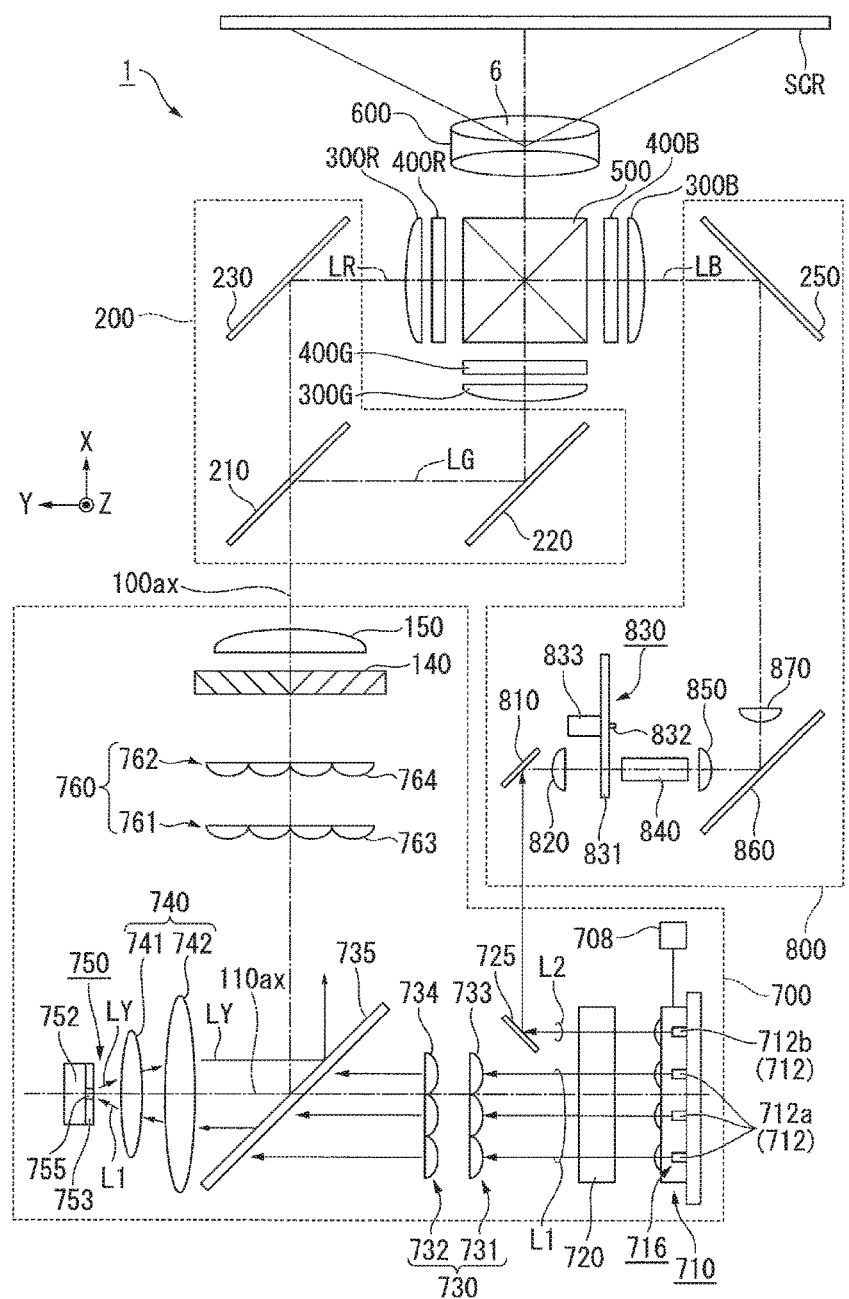
FIG. 1 is a schematic configuration diagram of a projector according to a first embodiment.

The projector 1 generally includes a light source apparatus 700, a light separation/light guide system 200, a light guide system 800, a light modulator for red light 400R, a light modulator for green light 400G, a light modulator for blue light 400B, a light combining system 500, and a projection system 600, as shown in FIG. 1.

The light source apparatus 700 includes a light source unit 710, a light ray flux compression system 720, a branching mirror 725 as a light branching element, a homogenizer system 730, a dichroic mirror 735, a collimation/light collection system 740, a wavelength conversion element 750, an optical integration system 760, a polarization conversion element 140, and a superimposing lens 150.

Figure 2:
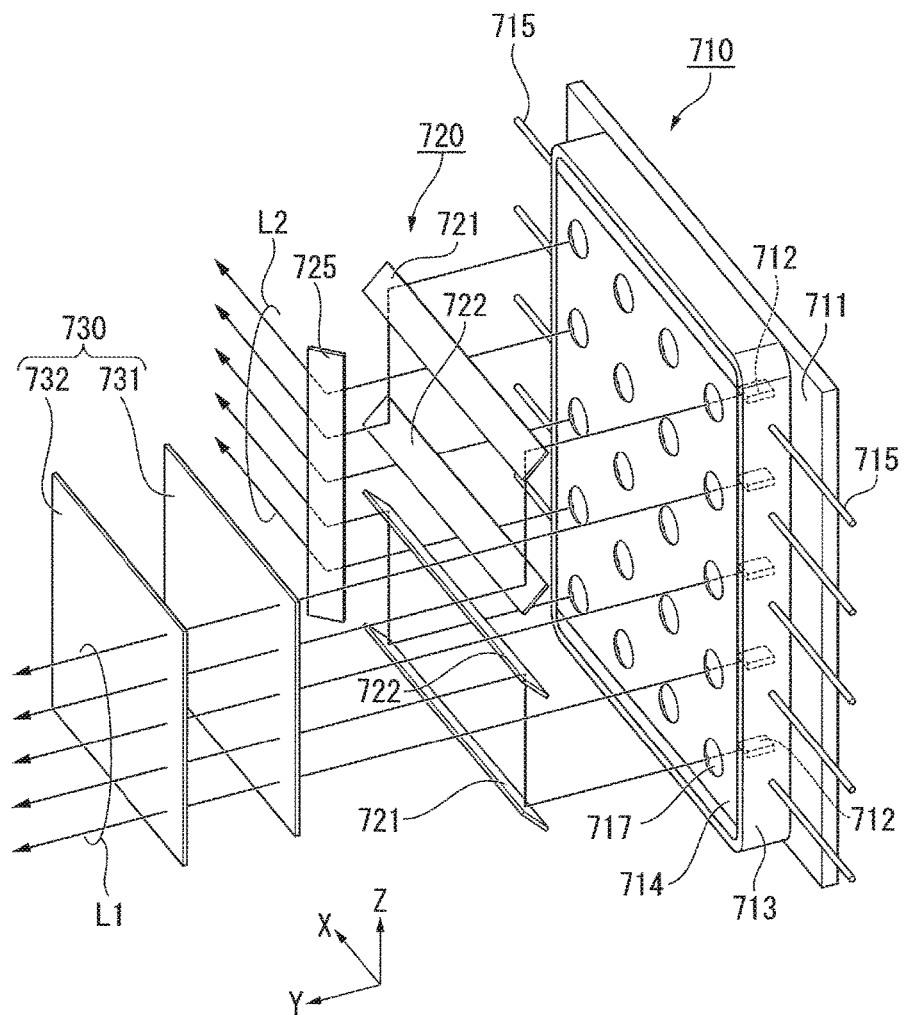
FIG. 2 is a perspective view showing the configurations of a light source unit and therearound.
Figure 3:
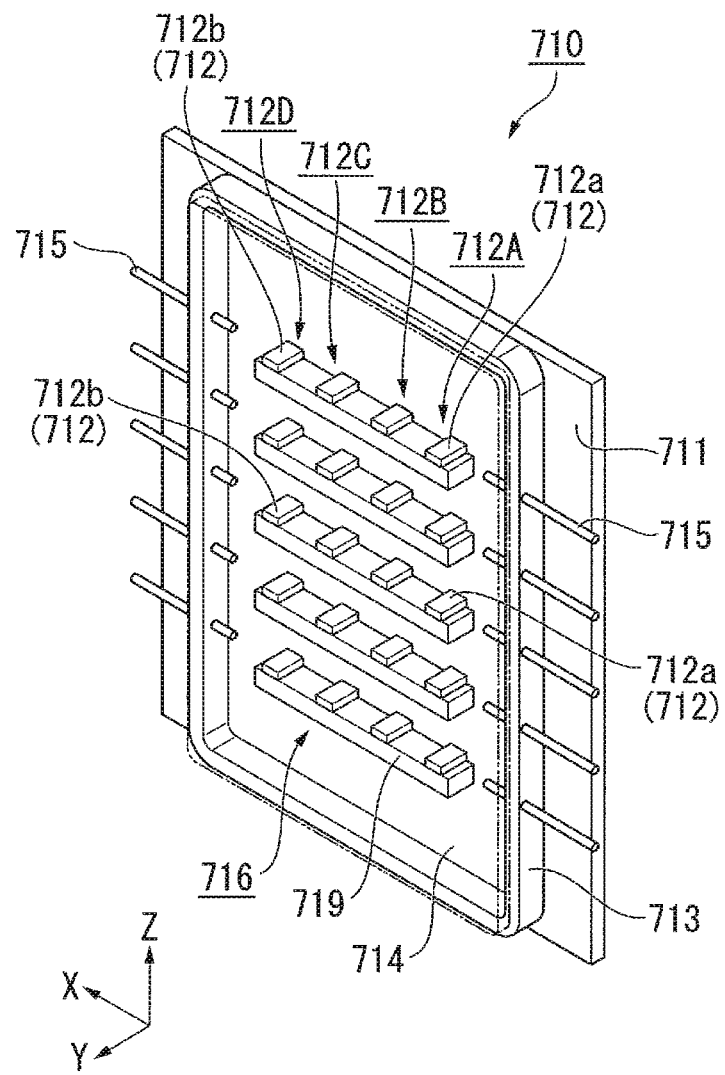
FIG. 3 is a perspective view of the light source unit.

FIG. 2 is a perspective view showing the configurations of the light source unit 710 and therearound. FIG. 3 is a perspective view of the light source unit 710.

The light source unit 710 includes a substrate 711, a light source array 716 formed of a plurality of light emitting devices 712 arrange in an array, a frame 713, a cover glass plate 714, and a plurality of electrode terminals 715, as shown in FIGS. 2 and 3. Wiring lines that connect the electrode terminals 715 to the light emitting devices 712 are omitted for simplification.

The light source array 716 is accommodated in the space surrounded by the substrate 711, the frame 713, and the cover glass plate 714. In the present embodiment, the light source array 716 has a configuration in which five light emitting devices 712 are arranged at predetermined intervals in the Z direction into a light emitting device column and four light emitting device columns are arranged in the X direction.

In the following description, the four light emitting device columns are referred to as a first light emitting device column 712A, a second light emitting device column 712B, a third light emitting device column 712C, and a fourth light emitting device column 712D sequentially from the right side in FIG. 3. The light emitting devices 712 that belong to the first to third light emitting device columns 712A to 712C are referred to as first light emitting devices 712a, and the light emitting devices 712 that belong to the fourth light emitting device column 712D are referred to as second light emitting devices 712b. In a case where it is not necessary to distinguish the first light emitting devices 712a and the second light emitting devices 712b from each other, they are also simply referred to as light emitting devices 712 in some cases.

Further, the plurality of light fluxes emitted from the plurality of light emitting devices 712 are collectively referred to as a light ray flux. The plurality of light fluxes emitted from the plurality of first light emitting devices 712a are collectively referred to as a first light ray flux L1, and the plurality of light fluxes emitted from the plurality of second light emitting devices 712b are collectively referred to as a second light ray flux L2.

The first light ray flux L1 functions as excitation light for exciting a phosphor layer 755 of the wavelength conversion element 750, which will be described later. The second light ray flux L2 functions as light caused to be incident on the light modulator for blue light 400B for generation of blue image light. In FIG. 2, part of the light is omitted for ease of illustration.

The light emitting devices 712 are each formed of a semiconductor laser that emits blue light having a specific linearly polarized light state. The first light emitting devices 712a and the second light emitting devices 712b differ from each other in terms of a peak wavelength at which the light emission intensity peaks. Specifically, a semiconductor laser that emits light having, for example, a peak wavelength of 446 nm is used as each of the first light emitting devices 712a, and a semiconductor laser that emits light having, for example, a peak wavelength of 460 nm is used as each of the second light emitting devices 712b. The wavelength of the first light ray flux L1 and the wavelength of the second light ray flux L2 therefore differ from each other. It is, however, noted that the wavelength of the first light ray flux L1 and the wavelength of the second light ray flux L2 may be equal to each other.

The substrate 711 is made, for example, of a metal having high thermal conductivity, such as copper.

The cover glass plate 714 has a plurality of collimator lenses 717 integrated therewith. The plurality of collimator lenses 717 are provided in the respective optical paths of the plurality of light fluxes that form the light ray fluxes. The collimator lenses 717 are each formed of a convex lens. The collimator lenses 717 each parallelize the light flux having emitted from the corresponding light emitting device 712. The collimator lenses 717 may be components separate from the cover glass plate 714.

Each set of the four light emitting devices 712 arranged in the X direction is fixed to a single sub-mount 71, as shown in FIG. 3. The four light emitting devices 712 are electrically connected in series to each other. The four light emitting devices 712 arranged in the X direction therefore form a single series circuit.

Two electrode terminals 715 are connected to each of the series circuits. One of the electrode terminals 715 functions as an anode, and the other electrode terminal 715 functions as a cathode. Current is supplied to the light emitting devices 712 via the two electrode terminals 715.

Figure 4:
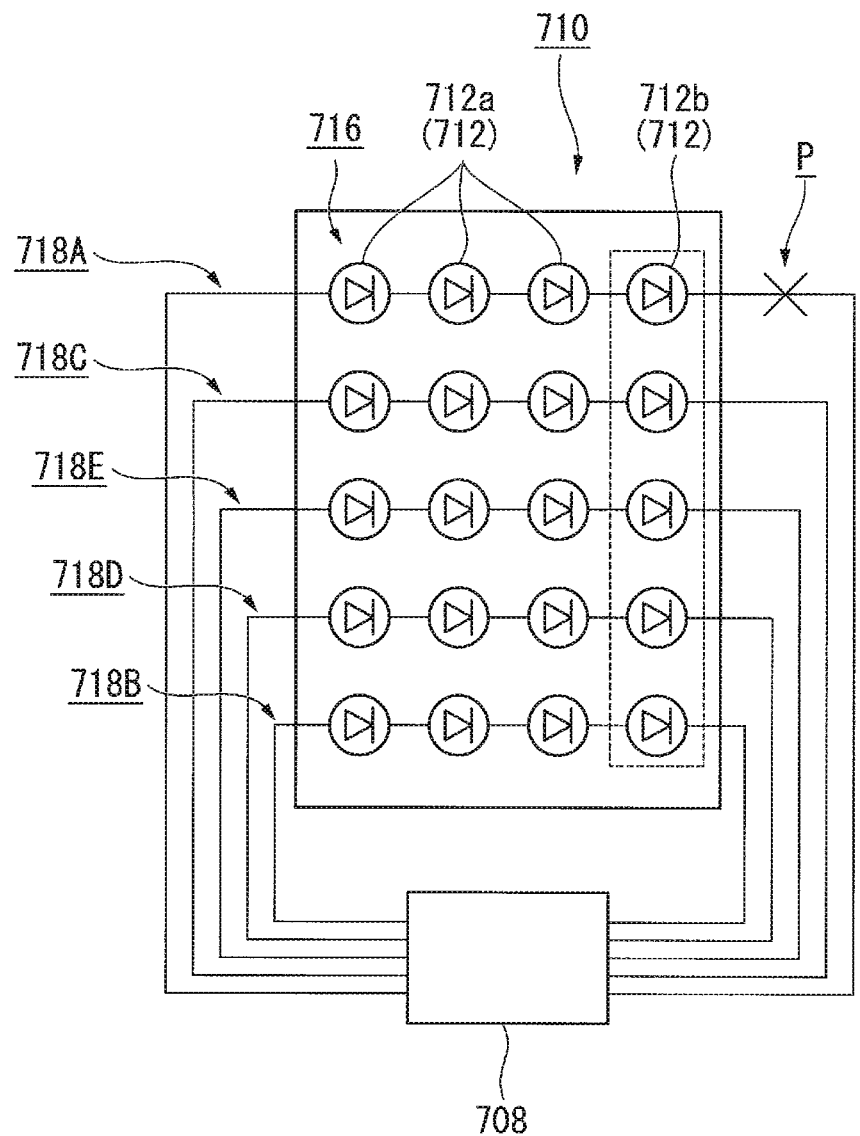
FIG. 4 is an equivalent circuit diagram of a light source array.

FIG. 4 is an equivalent circuit diagram of the light source array 716.

The light source array 716 includes the plurality of series circuits including first to fifth series circuits. In the following description, in the equivalent circuit diagram of FIG. 4, the top series circuit is referred to as a first series circuit 718A, the bottom series circuit is referred to as a second series circuit 718B, the second series circuit counted from the top is referred to as a third series circuit 718C, the second series circuit counted from the bottom is referred to as a fourth series circuit 718D, and the third series circuit counted from the top is referred to as a fifth series circuit 718E for ease of description.

The first to fifth series circuits 718A to 718E are each independently connected to a light source controller 708. The light source controller 708 individually controls current supplied to each of the series circuits. The first to fifth series circuits 718A to 718E each include three first light emitting devices 712a and one second light emitting device 712b.

The light source controller 708 has the function of controlling the light source array 716, for example, in such a way that the first series circuit 718A, the second series circuit 718B, the third series circuit 718C, and the fifth series circuit 718E operate but the fourth series circuit 718D does not operate.

The light ray flux compression system 720 is formed of pairs of reflection mirrors provided in the optical paths of the light fluxes emitted from the top and bottom light emitting devices 712 in the light emitting device columns, as shown in FIG. 2. The upstream reflection mirrors in the optical paths are each referred to as a first reflection mirror 721, and the downstream reflection mirrors in the optical paths are each referred to as a second reflection mirror 722. The reflection mirrors 721 and 722 each have a strip-like shape and are each so disposed that the longitudinal direction thereof coincides with the X direction. The reflection mirrors 721 and 722 are further each so disposed that the reflection surface inclines with respect to the Y direction and the Z direction by 45° when viewed in the X direction.

According to the configuration described above, the light fluxes emitted from the top light emitting devices 712 and traveling in the +Y direction are reflected off and deflected by the first reflection mirror 721 so that the traveling direction is changed to the −Z direction and then reflected off and deflected by the second reflection mirror 722 so that the traveling direction is changed to the +Y direction. Similarly, the light fluxes emitted from the bottom light emitting devices 712 and traveling in the +Y direction are reflected off and deflected by the first reflection mirror 721 so that the traveling direction is changed to the +Z direction and then reflected off and deflected by the second reflection mirror 722 so that the traveling direction is changed to the +Y direction.

The light fluxes emitted from the light emitting devices 712 other than the top and bottom light emitting devices 712 are not incident on the reflection mirrors 712 or 722 but travel straight in the +Y direction. The optical paths of the light fluxes emitted from the top light emitting devices 712 and reflected off the second reflection mirror 722 are located between the optical paths of the light fluxes emitted from the light emitting devices 712 in the second row from the top and the optical paths of the light fluxes emitted from the light emitting devices 712 in the third row from the top. Similarly, the optical paths of the light fluxes emitted from the bottom light emitting devices 712 and reflected off the second reflection mirror 722 are located between the optical paths of the light fluxes emitted from the light emitting devices 712 in the third row from the top and the optical paths of the light fluxes emitted from the light emitting devices 712 in the fourth row from the top.

The light ray flux compression system 720 thus compresses the Z-direction width of each of the light ray fluxes L1 and L2 outputted from the light source unit 710. The sizes of the branching mirror 725, the homogenizer system 730, and other optical elements, which will be described later, can therefore be reduced.

The branching mirror 725 is provided in the optical paths of the plurality of light fluxes emitted from the plurality of second light emitting devices 712b, which belong to the fourth light emitting device column 712D, that is, in the optical path of the second light ray flux L2. The branching mirror 725 has a strip-like shape and is so disposed that the longitudinal direction thereof coincides with the Z direction. The branching mirror 725 only needs to be provided in at least one of the optical path of the first light ray flux L1 and the optical path of the second light ray flux L2.

The second light flux L2 outputted from the fourth light emitting device column 712D and traveling in the +Y direction is reflected off and deflected by the branching mirror 725 so that the traveling direction is changed to the +X direction. On the other hand, the first light ray flux L1 outputted from the first to third light emitting device columns 712A to 712C is not incident on the branching mirror 725 but travels straight in the +Y direction. The branching mirror 725 thus causes the first light ray flux L1 and the second light ray flux L2 to travel in the directions different from each other.

The homogenizer system 730 includes a first lens array 731 and a second lens array 732, as shown in FIG. 1. The first lens array 731 includes a plurality of microlenses 733 for dividing the first light ray flux L1 outputted from the light source unit 710 into a plurality of sub-light fluxes. The plurality of microlenses 733 are arranged in a matrix in an XZ plane.

The second lens array 732 includes a plurality of microlenses 734 corresponding to the plurality of microlenses 733 in the first lens array 731. The second lens array 732 forms images of the microlenses 733 in the first lens array 731 in the vicinity of the phosphor layer 755 of the wavelength conversion element 750. The plurality of microlenses 734 are arranged in a matrix in an XZ plane.

The dichroic mirror 735 is provided in the optical path from the homogenizer system 730 to the collimation/light collection system 740. The dichroic mirror 735 is so disposed as to incline by 45° with respect to an optical axis 110ax and an illumination optical axis 110ax of the light source unit 710 and an illumination optical axis 100ax. The dichroic mirror 735 is characterized in that it transmits light that belongs to a blue wavelength region and reflects light that contains red light and green light and belongs to a yellow wavelength region.

The collimation/light collection system 740 not only causes the first light ray flux L1 having exited out of the dichroic mirror 735 to be incident on the phosphor layer 755 of the wavelength conversion element 750 with the first light ray flux L1 roughly focused but roughly parallelizes fluorescence light LY emitted from the phosphor layer 755. The collimation/light collection system 740 includes a first lens 741 and a second lens 742. The first lens 741 and the second lens 742 are each formed of a convex lens.

The wavelength conversion element 750 converts the first light ray flux L1 outputted from the light source unit 710 into the fluorescence light LY containing red light and green light. The wavelength conversion element 750 includes the phosphor layer 755, a substrate 752, which supports the phosphor layer 755, and a fixing member 753, which fixes the phosphor layer 755 to the substrate 752. In the wavelength conversion element 750, the phosphor layer 755 is supported by the substrate 752 via the fixing member 753, which is provided on the side surface of the phosphor layer 755, with a surface of the phosphor layer 755, that is, the surface opposite the side on which the first light ray flux L1 is incident, being in contact with the substrate 752.

The phosphor layer 755 contains a phosphor that absorbs the excitation light having, for example, a wavelength of 446 nm and is excited with the excitation light. The phosphor excited with the excitation light produces the fluorescence light (yellow light) LY having a peak wavelength that belongs to a wavelength region ranging, for example, from 500 to 700 nm. The phosphor layer 755 contains a base agent formed of an inorganic material and an activator agent that serves as light emission centers dispersed in the base agent. The phosphor layer 755 is formed, for example, of a YAG-based phosphor made of $(Y,Gd)_3(Al,Ga)_5O_{12}$(YAG:Ce) with Ce serving as the activator agent.

A reflection layer (not shown) made of a metal having high reflectance, such as silver or aluminum, is provided on the side surface and the bottom surface of the phosphor layer 755. The excitation light and the fluorescence light in the phosphor layer 755 are reflected off the reflection layer. The upper surface of the phosphor layer 755A is polished and provided with an anti-reflection coating. The configuration described above suppresses reflection of the first light ray flux L1 incident on the phosphor layer 755 and allows the fluorescence light LY to exit through the surface on which the first light ray flux L has been incident. That is, the configuration in the present embodiment provides a reflective wavelength conversion element 750.

The substrate 752 is made of a metal material having high thermal conductivity, such as copper.

The fluorescence light LY emitted from the wavelength conversion element 750 is parallelized by the collimation/light collection system 740, is then reflected off the dichroic mirror 735, and enters the optical integration system 760.

The optical integration system 760 includes a first lens array 761 and a second lens array 762. The first lens array 761 includes a plurality of microlenses 763 for dividing the fluorescence light LY having exited out of the dichroic mirror 735 into a plurality of sub-light fluxes. The plurality of microlenses 763 are arranged in a matrix in a plane perpendicular to the illumination optical axis 100ax.

The second lens array 762 includes a plurality of microlenses 764 corresponding to the plurality of microlenses 763 in the first lens array 761. The second lens array 762 forms, along with the superimposing lens 150, images of the microlenses 763 in the first lens array 761 in the vicinity of an image formation area of each of the light modulator 400R for red light, the light modulator 400G for green light, and the light modulator 400B for blue light. The plurality of microlenses 764 are arranged in a matrix in a plane perpendicular to the illumination optical axis 100ax.

The polarization conversion element 140 converts each of the divided sub-light ray fluxes from the first lens array 761 into a linearly polarized light ray flux. The polarization conversion element 140 includes polarization separation layers, reflection layers, and retardation layers, although not shown.

The superimposing lens 150 collects the sub-light ray fluxes from the polarization conversion element 140 and superimposes the sub-light ray fluxes on one another in the vicinity of the image formation area of each of the light modulator 400R for red light, the light modulator 400G for green light, and the light modulator 400B for blue light. The first lens array 761, the second lens array 762, and the superimposing lens 150 form an optical integration system that homogenizes the in-plane optical intensity distribution of the fluorescence light LY emitted from the wavelength conversion element 750.

The color separation/light guide system 200 separates the fluorescence light LY into the red light LR and the green light LG, causes the red light LR to be incident on the light modulator for red light 400R, and causes the green light LG to be incident on the light modulator for red light 400G. The color separation/light guide system 200 incudes a dichroic mirror 210, a first reflection mirror 230, and a second reflection mirror 220.

The dichroic mirror 210 separates the fluorescence light LY having exited out of the superimposing lens 150 into the red light LR and the green light LG.

The first reflection mirror 230 reflects the red light LR having passed through the dichroic mirror 210 and causes the red light LR to be incident on the light modulator for red light 400R. The second reflection mirror 220 reflects the green light LG reflected off the dichroic mirror 210 and causes the green light LG to be incident on the light modulator for green light 400G.

The light guide system 800 includes a first reflection mirror 810, a light collection lens 820, a diffuser element 830, a rod integrator 840, a first lens 850, a second reflection mirror 860, a second lens 870, and a third reflection mirror 250. The first reflection mirror 810, the light collection lens 820, the diffuser element 830, the rod integrator 840, the first lens 850, the second reflection mirror 860, the second lens 870, and the third reflection mirror 250 are provided in this order along the optical path of the second light ray flux L2 reflected off the branding mirror 725.

The second light ray flux L2 having exited out of the branching mirror 725 is reflected off the first reflection mirror 810 and incident on the collector lens 820.

The light collection lens 820 collects the second light ray flux L2 and directs the collected second light ray flux L2 toward the light incident end surface of the rod integrator 840, which is formed of a square-pole-shaped light transmissive member.

The diffuser element 830 includes a diffuser plate 831 and a motor 833 for rotating the diffuser plate 831 around a rotary shaft 832. The diffuser element 830 converts the second light ray flux L2 into diffused light. As a result, occurrence of speckles that lower display quality is suppressed. A ground glass plate made, for example, of an optical glass material is used as the diffuser plate 831.

The second light ray flux L2 having exited out of the rod integrator 840 travels via the first lens 850, the second reflection mirror 860, the second lens 870, and the third reflection mirror 250 and is incident on the light modulator for blue light 400B.

The light modulator for red light 400R modulates the red light LR in accordance with image information to form image light corresponding to the red light LR. The light modulator for green light 400G modulates the green light LG in accordance with image information to form image light corresponding to the green light LG. The light modulator for blue light 400B modulates the blue light LB in accordance with image information to form image light corresponding to the blue light LB.

A transmissive liquid crystal panel is, for example, used as each of the light modulator for red light 400R, the light modulator for green light 400G, and the light modulator for blue light 400B. A pair of polarizers (not shown) are disposed on the light incident side and light exiting side of each of the liquid crystal panels. In the present embodiment, the polarization state of the second light ray flux L2 is so set that the second light ray flux L2 is allowed to pass through the light-incident-side polarizer with the polarization state maintained.

Field lenses 300R, 300G, and 300B are disposed on the light incident side of the light modulator for red light 400R, the light modulator for green light 400G, and the light modulator for blue light 400B, respectively. The field lenses 300R, 300G, and 300B parallelize the red light LR, the green light LG, and the blue light LB to be incident on the light modulator for red light 400R, the light modulator for green light 400G, and the light modulator for blue light 400B, respectively.

The light combining system 500 combines the image light fluxes from the light modulator for red light 400R, the light modulator for green light 400G, and the light modulator for blue light 400B with one another and causes the combined image light to exit toward the projection system 600. A cross dichroic prism is, for example, used as the light combining system 500.

The projection system 600 is formed of a projection lens group 6. The projection system 600 enlarges the combined image light from the light combining system 500 and projects the enlarged image light toward the screen SCR. An enlarged color image is thus displayed on the screen SCR.

Assume now that open failure P has occurred in the first series circuit 718A, as shown in FIG. 4. In this case, no current is supplied to the four light emitting devices 712 provided in the first series circuit 718A, and none of these light emitting devices 712 therefore emits light. In the light source apparatus of related art, in a case where these light emitting devices are formed of the second light emitting devices, no second light ray flux is outputted from the light source apparatus, and the projector cannot display an image having a predetermined color.

In contrast, in the light source apparatus 700 according to the present embodiment, the first to fifth series circuits 718A to 718E in the light source array 716 each include three first light emitting devices 712a and one second light emitting device 712b. Therefore, even if all the light emitting devices 712 provided in the first series circuit 718A do not emit light, the first light emitting devices 712a and the second light emitting device 712b provided in each of the second to fifth series circuits 718B to 718E emit light, whereby the first light ray flux L1 and the second light ray flux L2 exit out of the light source apparatus 700. As a result, the projector 1 according to the present embodiment can display an image having a predetermined color.

In general, the ratio between the amount of blue light and the amount of excitation light for generation of standard white light is preferably about 20%:80%. From this point of view, in the case of the projector 1 according to the present embodiment, out of the four light emitting device columns 712A to 712D in the light source unit 710, one light emitting device column is assigned to the second light emitting devices 712b (light emitting devices for blue light), and three light emitting device columns are assigned to the first light emitting devices 712a (light emitting devices for excitation light). Provided that the light fluxes from all the light emitting device columns 712A to 712D have the same amount of light, the blue light accounts for about 25%, and the excitation light accounts for about 75%. The light amount ratio is close to the ideal light amount ratio described above, and there is an adjustment margin of 5% in a case where the amount of blue light is so adjusted as to decrease. The configuration of the light source unit 710 is therefore rational, and the light ray flux from the light source unit 710 can be effectively used.

In the present embodiment, in which the five series circuits 718A to 718E each include three first light emitting devices 712a and one light emitting device 712b, the ratio between the amount of blue light and the amount of excitation light does not change even if open failure occurs in any of the series circuits. An image having a predetermined color can therefore be displayed also from this point of view.

In a case where open failure occurs in one of the series circuits, the light amount ratio does not change, but the overall amount of light decrease. In this case, the brightness of an image undesirably decreases, and white balance of the illumination light undesirably changes because the amount of excitation light decreases and the conversion efficiency of the phosphor layer increases accordingly. In this case, the effect of the decrease in the overall amount of light can be reduced by increasing the amount of current supplied to the series circuits in each of which no open failure has occurred as compared with the amount of current in a normal condition.

The light source controller 708 may cause all the series circuits 718A to 718E to operate in the normal use condition but may instead control the light source array 716 in such a way that the first series circuit 718A, the second series circuit 718B, the third series circuit 718C, and the fifth series circuit 718E to operate but the fourth series circuit 718D does not operate. In this case, the light source controller 708 allows the fourth series circuit 718D to operate when open failure occurs. The fourth series circuit 718D can therefore be used as a backup series circuit, whereby the decrease in the overall amount of light in the case where open failure occurs can be avoided.

Further, since the light source apparatus 700 according to the present embodiment further includes the wavelength conversion element 750, which converts the first light ray flux L1 into the fluorescence light LY, the second light ray flux L2 and the fluorescence light LY can be used to output light having a predetermined color. Since the light source apparatus 700 according to the present embodiment further includes the diffuser element 830, which converts the second light ray flux L2 into the diffused light, the angular distribution of the second light ray flux L2 is allowed to approach the angular distribution of the fluorescence light LY. As a result, color unevenness of the exiting light formed of the second light ray flux L2 and the fluorescence light LY can be suppressed.

Further, in the light source apparatus 700 according to the present embodiment, the wavelength of the first light ray flux L1 and the wavelength of the second light ray flux L2 differ from each other. Therefore, the first light ray flux L1 has an optimum wavelength as the wavelength of the excitation light that excites the phosphor layer 755, and the second light ray flux L2 has an optimum wavelength as the wavelength of the blue light that produces image light. That is, the wavelength of each of the light ray fluxes L1 and L2 can be optimized in accordance with the use of each of the first light ray flux L1 and the second light ray flux L2.

Second Embodiment

A second embodiment of the invention will be described below with reference to FIG. 5.

The basic configuration of a projector according to the second embodiment is the same as that in the first embodiment, and the second embodiment differs from the first embodiment in terms of the configuration of the light source unit. No description of the overall projector will therefore be made, and only the light source unit will be described.

Figure 5:
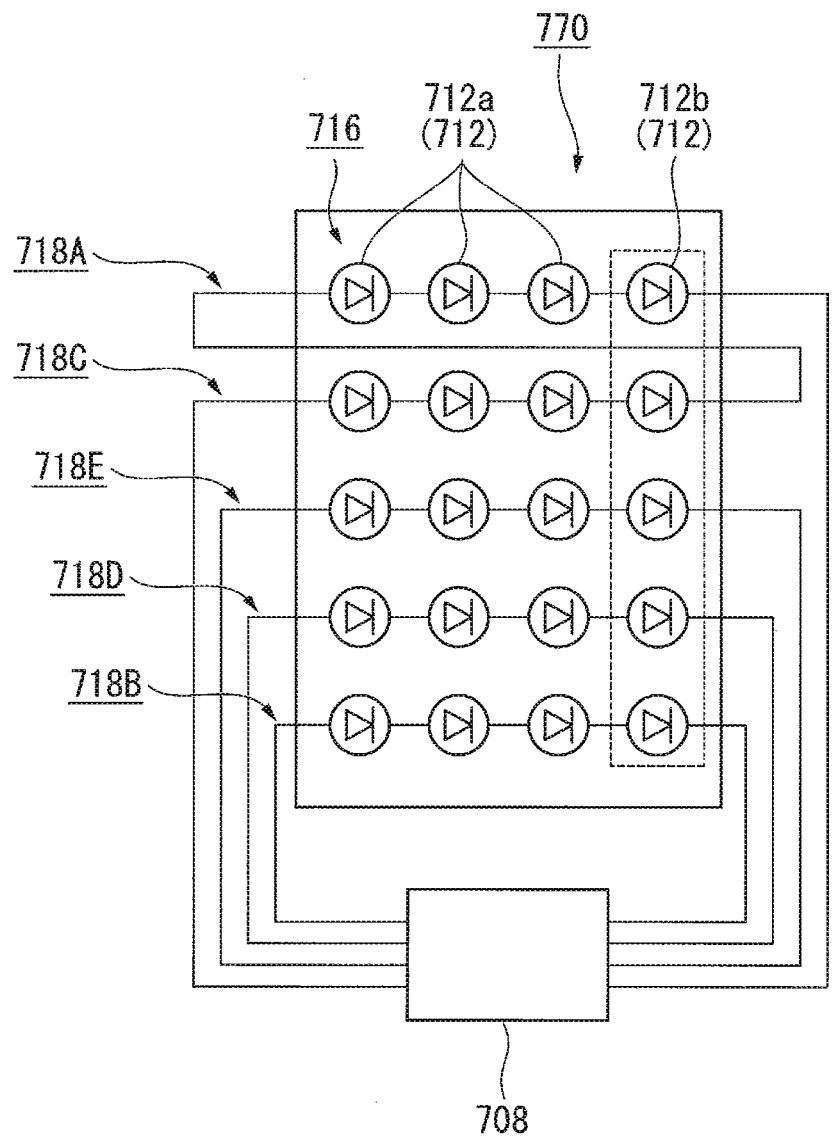
FIG. 5 is an equivalent circuit diagram of a light source unit in a second embodiment.

FIG. 5 is an equivalent circuit diagram of the light source unit in the second embodiment.

In FIG. 5, components common to those in FIG. 4 used in the first embodiment have the same reference characters and will not be described in detail.

In a light source unit 770 in the present embodiment, the light source array 716 includes a plurality of series circuits including the first to fifth series circuits 718A to 718E, as shown in FIG. 5. Out of the five series circuits 718A to 718E, the third series circuit 718C is connected in series to the first series circuit 718A. The first to fifth series circuits 718A to 718E each includes three first light emitting devices 712a and one second light emitting device 712b.

The other configurations are the same as those in the first embodiment.

Also in the present embodiment, a projector capable of stably displaying an image having a predetermined color can be provided. That is, the same advantageous effect as that provided by the first embodiment is provided.

Further, in the present embodiment, since the first series circuit 718A and the third series circuit 718C form a single series circuit, the number of circuits to be controlled by the light source controller 708 decreases, whereby the light source controller 708 can control the plurality of series circuits in a simplified manner.

Third Embodiment

A third embodiment of the invention will be described below with reference to FIGS. 6 and 7.

The basic configuration of a projector according to the third embodiment is the same as that in the first embodiment, and the third embodiment differs from the first embodiment in terms of the configurations of the light source apparatus and the color separation/light guide system.

Figure 6:
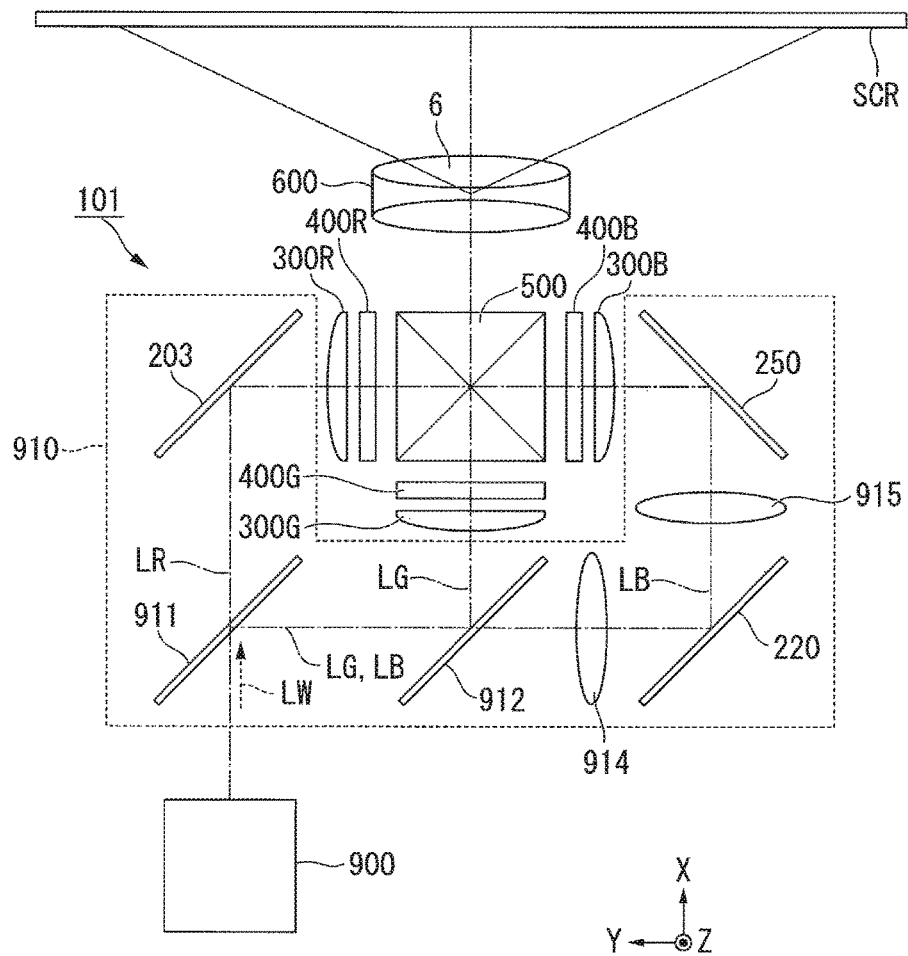
FIG. 6 is a schematic configuration diagram of a projector according to a third embodiment.

FIG. 6 is a schematic configuration diagram of the projector according to the third embodiment. FIG. 7 is a schematic configuration diagram of the light source apparatus.

Figure 7:
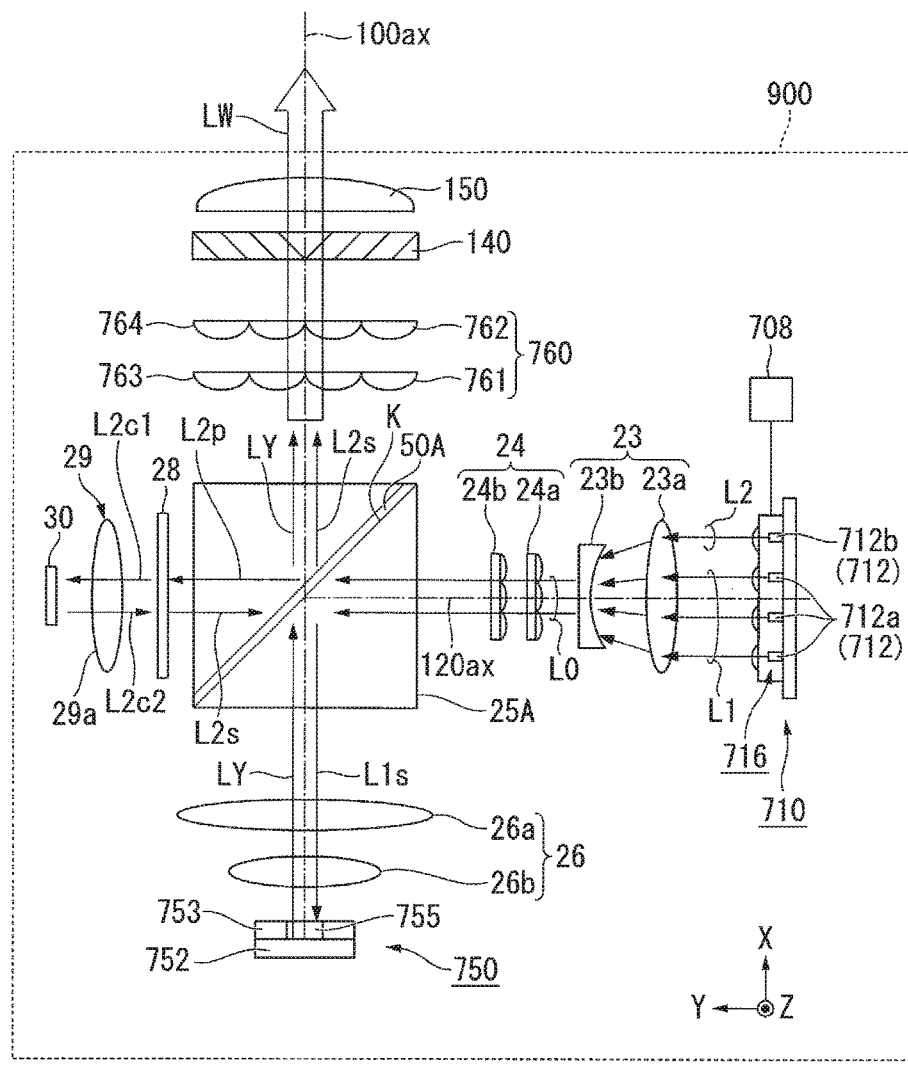
FIG. 7 is a schematic configuration diagram of a light source apparatus.

In FIGS. 6 and 7, components common to those in the drawings used in the first embodiment have the same reference characters and will not be described in detail.

In a projector 101 according to the present embodiment, a light source apparatus 900 outputs white illumination light LW containing the fluorescence light LY (yellow light) and the second light ray flux L2 (blue light), as shown in FIG. 6. The configuration of the light source apparatus 900 will be described later.

A color separation/light guide system 910 separates the white illumination light LW into the red light LR, the green light LG, and the blue light LB. The color separation/light guide system 910 includes a first dichroic mirror 911, a second dichroic mirror 912, the first reflection mirror 230, the second reflection mirror 220, the third reflection mirror 250, a first relay lens 914, and a second relay lens 915.

The first dichroic mirror 911 separates the illumination light LW from the light source apparatus 900 into the red light LR and light containing the green light LG and the blue light LB. The first dichroic mirror 911 transmits the red light LR and reflects the light containing the green light LG and the blue light LB. The second dichroic mirror 912 separates the light containing the green light LG and the blue light LB into the green light LG and the blue light LB. The second dichroic mirror 912 reflects the green light LG and transmits the blue light LB.

The first reflection mirror 230 reflects the red light LR having passed through the first dichroic mirror 911 toward the light modulator for red light 400R. The second reflection mirror 220 and the third reflection mirror 250 reflect the blue light LB having passed through the second dichroic mirror 912 toward the light modulator for blue light 400B. The green light LG is reflected off the second dichroic mirror 912 toward the light modulator for green light 400G.

The first relay lens 914 and the second relay lens 915 are disposed in the optical path of the blue light LB.

The light source apparatus 900 includes the light source unit 710, an afocal system 23, a homogenizer system 24, an optical element 25A including a polarization separation element 50A (light branching element plus light ray combining system), a first pickup system 26, the wavelength conversion element 750, a retardation film 28, a second pickup system 29, a diffusive reflection element 30 (diffuser element), the optical integration system 760, the polarization conversion element 140, and the superimposing lens 150, as shown in FIG. 7.

The light source unit 710 includes the light source array 716, which is the same as that in the first embodiment, and outputs the first light ray flux L1 and the second light ray flux L2.

The light containing the first light ray flux L1 and the second light ray flux L2 outputted from the light source unit 710 enters the afocal system 23. The afocal system 23 adjusts the light flux diameter of the light. The afocal system 23 is formed, for example, of a first afocal lens 23a and a second afocal lens 23b.

Light L0 having exited out of the afocal system 23 enters the homogenizer system 24. The homogenizer system 24 converts the intensity distribution of the light L0 into a uniform intensity distribution (what is called top-hat distribution). The homogenizer system 24 is formed, for example, of a first multi-lens array 24a and a second multi-lens array 24b.

The light L0 having exited out of the homogenizer system 24 is incident on the optical element 25A. The optical element 25A is formed, for example, of a dichroic prism having wavelength selectivity. The dichroic prism has an inclining surface K, which inclines by 45° with respect to the optical axis 100ax and an optical axis 120ax. The optical element 25A is not limited to a prism-shaped component, such as a dichroic prism, and may be a dichroic mirror having a parallel flat plate shape.

The inclining surface K is provided with the polarization separation element 50A having wavelength selectivity. The polarization separation element 50A has a polarization separation function of separating the light L0 into an S-polarized component and a P-polarized component. The polarization separation element 50A further has a color separation function of transmitting the fluorescence light LY (light that belongs to yellow band) that belongs to a wavelength band different from the wavelength band to which the first light ray flux L1 and the second light ray flux L2 belong (light that belongs to blue band) irrespective of the polarization state of the fluorescence light LY. The polarization separation element 50A having the characteristics described above separates the first light ray flux L1 and the second light ray flux L2 from each other and combines the fluorescence light LY and the second light ray flux L2 with each other.

Specifically, the first light ray flux L1, which is S-polarized light, which is reflected off the polarization separation element 50A, is reflected off the polarization separation element 50A toward the wavelength conversion element 750. The second light ray flux L2, which is P-polarized light, which passes through the polarization separation element 50A, passes through the polarization separation element 50A toward the diffusive reflection element 30.

A first light ray flux L1s having exited out of the polarization separation element 50A is collected by the first pickup system 26 and incident on the phosphor layer 755. The first pickup system 26 is formed, for example, of a first pickup lens 26a and a second pickup lens 26b.

The fluorescence light LY emitted from the wavelength conversion element 750 is parallelized by the first pickup system 26, then passes through the polarization separation element 50A because the fluorescence light LY is non-polarized light, and enters the optical integration system 760.

On the other hand, a second light ray flux L2p having exited out of the polarization separation element 50A is converted by the retardation film 28, for example, into a right-handed circularly polarized second light ray flux L2c1. The retardation film 28 is formed of a quarter-wave plate disposed in the optical path between the polarization separation element 50A and the diffusive reflection element 30. The second light ray flux L2c1 is collected by the second pickup system 29 and incident on the diffusive reflection element 30.

The second pickup system 29 is formed, for example, of a pickup lens 29a.

The diffusive reflection element 30 converts the second light ray flux L2c1 into a left-handed circularly polarized second light ray flux L2c2 and diffuses and reflects the second light ray flux L2c2 toward the polarization separation element 50A. The diffusive reflection element 30 is preferably a reflection element that reflects the second light ray flux L2 incident thereon in a Lambertian reflection scheme.

The second light ray flux L2c2 is converted by the retardation film 28 into S-polarized second light ray flux L2s. The second light ray flux L2s is reflected off the polarization separation element 50A toward the optical integration system 760.

The second light ray flux L2s and the fluorescence light LY exit out of the polarization separation element 50A in the same direction and form the illumination light LW.

The configuration downstream of the optical integration system 760 is the same as that in the first embodiment.

The light source apparatus 900 according to the present embodiment combines the second light ray flux L2s and the fluorescence light LY with each other inside the light source apparatus 900 and outputs the white illumination light LW, unlike the light source apparatus 700 according to the first embodiment. In a light source apparatus of this type in related art, in a case where only the second light emitting devices 712b are assigned to one series circuit, and when open failure occurs in the series circuit, the illumination light contains no blue light component, and no white illumination light is therefore produced.

In contrast, in the light source apparatus 900 according to the present embodiment, the first to fifth series circuits in the light source array 716 each include at least one light emitting device 712a and at least one light emitting device 712b. Therefore, even if open failure occurs in any one of the series circuits, the light source apparatus 900 outputs the white illumination light LW, which is the combination of the second light ray flux L2s and the fluorescence light LY. As a result, the projector 101 according to the present embodiment can display an image having a predetermined color.

The technical scope of the invention is not limited to the embodiments described above, and a variety of changes can be made thereto to the extent that the changes do not depart from the substance of the invention.

For example, in the first embodiment described above, out of the four light emitting device columns in the light source unit, three light emitting device columns are assigned to the excitation light, and one light emitting device column is assigned to the blue light, but the number of light emitting device columns to be assigned to each of the excitation light and the blue light is not necessarily limited to the number in the example described above. For example, the light ray fluxes from two light emitting device columns may be incident on the branching mirror, or the numbers described above can be changed in any other manner as appropriate.

Further, in the embodiments described above, a plurality of light emitting devices arranged in one direction form one series circuit, but a plurality of light emitting devices arranged in one direction may not necessarily form one series circuit. For example, four light emitting devices arranged in two rows and two columns may form one series circuit. The light source apparatus according to any of the embodiments of the invention only needs to be so configured that the four light emitting devices that form the series circuit include at least one first light emitting device and at least one second light emitting device.

As the light branching element, the mirror may be replaced with a prism or any other optical element. Further, as the diffuser element in the first embodiment, the configuration in which the diffuser plate is rotated is presented by way of example, and a configuration in which the diffuser plate is vibrated, a configuration in which the diffuser plate is swung, or any other configuration may be employed.

In addition, the number, shape, material, arrangement, and other factors of each of the components that form the light source apparatus and the projector can be changed as appropriate. Further, as each of the light modulators, the liquid crystal panel described above is not necessarily used, and a digital mirror device can, for example, be used.

Further, in the embodiments described above, the case where the light source apparatus according to any of the embodiments of the invention is incorporated in a projector is presented by way of example, but the invention is not limited to the case. The light source apparatus according to any of the embodiments of the invention can also be used, for example, as a lighting apparatus and an automobile headlight.

The entire disclosure of Japanese Patent Application No. 2017-032363, filed on Feb. 23, 2017 is expressly incorporated by reference herein.

What is claimed is:

1. A light source apparatus comprising:
a light source array including a plurality of first light emitting devices and a plurality of second light emitting devices; and
a light branching element that causes a first light ray flux emitted from the plurality of first light emitting devices and a second light ray flux emitted from the plurality of second light emitting devices to travel in directions different from each other,
wherein the light source array is formed of a plurality of series circuits including a first series circuit and a second series circuit, and
the first series circuit and the second series circuit each include at least one of the plurality of first light emitting devices and at least one of the plurality of second light emitting devices.

2. The light source apparatus according to claim 1, further comprising a wavelength conversion element that converts the first light ray flux into fluorescence light.

3. The light source apparatus according to claim 2, further comprising a diffuser element that converts the second light ray flux into diffused light.

4. The light source apparatus according to claim 1,
wherein the plurality of series circuits further include a third series circuit, and
the third series circuit is connected in series to the first series circuit.

5. The light source apparatus according to claim 1,
further comprising a light source controller that controls the light source array,
wherein the plurality of series circuits further include a fourth series circuit,
the fourth series circuit includes at least one of the plurality of first light emitting devices and at least one of the plurality of second light emitting devices, and
the light source controller has a function of controlling the light source array in such a way that the first series circuit and the second series circuit operate but the fourth series circuit does not operate.

6. The light source apparatus according to claim 1, wherein a wavelength of the first light ray flux and a wavelength of the second light ray flux differ from each other.

7. The light source apparatus according to claim 1, further comprising a light ray combining system that combines the fluorescence light and the second light ray flux with each other.

8. A projector comprising:
the light source apparatus according to claim 1;
a light modulator that modulates light from the light source apparatus in accordance with image information to produce image light; and
a projection system that projects the image light.

9. A projector comprising:
the light source apparatus according to claim 2;
a light modulator that modulates light from the light source apparatus in accordance with image information to produce image light; and
a projection system that projects the image light.

10. A projector comprising:
the light source apparatus according to claim 3;
a light modulator that modulates light from the light source apparatus in accordance with image information to produce image light; and
a projection system that projects the image light.

11. A projector comprising:
the light source apparatus according to claim 4;
a light modulator that modulates light from the light source apparatus in accordance with image information to produce image light; and
a projection system that projects the image light.

12. A projector comprising:
the light source apparatus according to claim 5;
a light modulator that modulates light from the light source apparatus in accordance with image information to produce image light; and
a projection system that projects the image light.

13. A projector comprising:
the light source apparatus according to claim 6;
a light modulator that modulates light from the light source apparatus in accordance with image information to produce image light; and
a projection system that projects the image light.

14. A projector comprising:
the light source apparatus according to claim 7;
a light modulator that modulates light from the light source apparatus in accordance with image information to produce image light; and
a projection system that projects the image light.

* * * * *